United States Patent
Liu et al.

(10) Patent No.: US 11,158,221 B2
(45) Date of Patent: Oct. 26, 2021

(54) DISPLAY PANEL, PANEL LIGHTING TEST METHOD OF THE SAME AND DISPLAY DEVICE (71) Applicant: WuHan TianMa Micro-Electronics Co., Ltd., Wuhan (CN)

(72) Inventors: Xinzhao Liu, Wuhan (CN); Kaihong Huang, Wuhan (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 16/131,118

(22) Filed: Sep. 14, 2018

(65) Prior Publication Data
US 2019/0164460 A1 May 30, 2019

(30) Foreign Application Priority Data
Nov. 29, 2017 (CN) .......................... 201711226272.3

(51) Int. Cl.
*G09G 3/30* (2006.01)
*G09G 3/36* (2006.01)
(Continued)

(52) U.S. Cl.
CPC ......... *G09G 3/006* (2013.01); *G02F 1/13452* (2013.01); *G02F 1/13458* (2013.01);
(Continued)

(58) Field of Classification Search
CPC .................. G09G 2330/08–10; G01R 31/2635
See application file for complete search history.

(56) References Cited

U.S. PATENT DOCUMENTS

2006/0192585 A1* 8/2006 Chen ...................... G09G 3/006
324/760.01
2006/0202923 A1* 9/2006 Osada .................... G09G 3/006
345/76
(Continued)

FOREIGN PATENT DOCUMENTS

| CN | 101191910 A | 6/2008 |
|----|-------------|--------|
| CN | 105810136 A | 7/2016 |
| CN | 107065353 A | 8/2017 |

OTHER PUBLICATIONS

Chinese Office Action dated Jul. 17, 2020 for corresponding Chinese Application No. 201711226272.3 and English translation.
(Continued)

*Primary Examiner* — Sanghyuk Park
(74) *Attorney, Agent, or Firm* — Tarolli, Sundheim, Covell & Tummino LLP (57) ABSTRACT

Provided is a display panel, a panel lighting test method thereof, and a display device. The display panel includes a display area and a non-display area. The display area includes a plurality of data lines, and at least two of data lines are different in length in the display area. The non-display area includes a panel lighting test terminal for inputting panel lighting signals to the display panel and a switching circuit including a plurality of switching units, and each switching units is associated to at least two data lines. The panel lighting test terminal is connected to the plurality of switching units, and connected to an i-th switching unit closest to the panel lighting test terminal through first lines. The display panel for image display solves the problem of the insufficient test accuracy due to signal delay in the related art.

20 Claims, 8 Drawing Sheets (51) Int. Cl.
  *G09G 3/00* (2006.01)
  *G02F 1/1345* (2006.01)
  *G02F 1/1362* (2006.01)

(52) U.S. Cl.
  CPC .............. *G02F 1/136286* (2013.01); *G09G 2310/0202* (2013.01); *G09G 2310/0297* (2013.01); *G09G 2310/08* (2013.01)

(56) References Cited

U.S. PATENT DOCUMENTS

| | | | | |
|---|---|---|---|---|
| 2009/0102758 A1* | 4/2009 | Anzai | ................ | G09G 3/2096 345/76 |
| 2014/0078187 A1* | 3/2014 | Choi | ................ | G09G 3/00 345/690 |
| 2015/0355487 A1* | 12/2015 | Emmert | ................ | G02F 1/13454 349/33 |
| 2016/0190166 A1* | 6/2016 | Kim | ................ | H01L 27/1255 257/71 |
| 2016/0196773 A1* | 7/2016 | Liu | ................ | G09G 3/006 345/206 |
| 2016/0240595 A1* | 8/2016 | Kim | ................ | H01L 27/3223 |
| 2017/0162093 A1* | 6/2017 | Kang | ................ | G09G 3/006 |
| 2017/0221435 A1* | 8/2017 | Shima | ................ | G09G 3/3648 |
| 2017/0337859 A1* | 11/2017 | Hirata | ................ | G09G 3/006 |
| 2018/0090093 A1* | 3/2018 | Wang | ................ | G09G 3/36 |
| 2018/0190946 A1* | 7/2018 | Li | ................ | G09G 3/36 |

OTHER PUBLICATIONS

Chinese Office Action dated Mar. 9, 2021 for corresponding Chinese Application No. 201711226272.3, and English translation thereof.

\* cited by examiner

S1 — in a first period of time, providing scanning signals to gate lines in a time division manner, when each of the gate lines receives the scanning signal, the screen lighting test terminal provides an i-th switching unit with a turn-on signal to control all of the switching units to be turned on, and screen lighting signals are transmitted to the associated data lines through the switching units, wherein the i-th switching unit is a switching unit in the plurality of switching units closest to the screen lighting test terminal.

S2 — in a second period of time, controlling, by a turn-on signal control terminal, all of the switching units to be turned on, and providing the scanning signals to the gate lines in a time division manner, wherein when each of the gate lines receives the scanning signal, a driving unit controls a plurality of multiplexers to provide data signals to the associated data lines in a time division manner, wherein the second period of time is a period of time different from the first period of time.

DISPLAY PANEL, PANEL LIGHTING TEST METHOD OF THE SAME AND DISPLAY DEVICE

CROSS-REFERENCE TO RELATED APPLICATIONS

The present application claims the benefit of priority to Chinese Patent Application No. 201711226272.3, filed on Nov. 29, 2017, the content of which is incorporated herein by reference in its entirety.

TECHNICAL FIELD

The present disclosure relates to the field of display technologies and, particularly, to a display panel, a panel lighting test method thereof and a display device.

BACKGROUND

With the continuous development of display technology, the special-shaped display panel has been widely applied. For example, the shape of the display panel is a rounded rectangle, that is, the adjacent two right-angle edges are connected by an arc.

Figure 1:
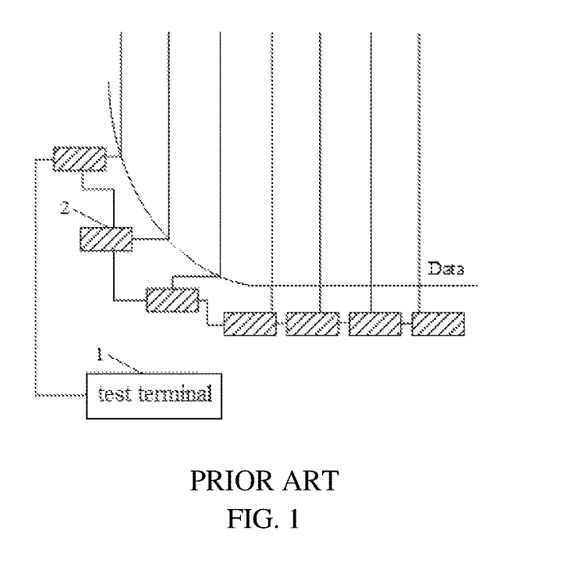
FIG. 1 is a schematic structural diagram of a display panel in the related art.

It is well-known that, before the display panel is put into use, a panel lighting test of the display panel needs to be performed to test whether the display panel can display normally or not. As shown in FIG. 1, the display panel includes a test terminal 1 and a plurality of connected switching devices 2. The switching devices 2 are correspondingly connected to data lines Data, and the test terminal 1 is connected to the first switching device. When the panel lighting test of the display panel is performed, the test terminal 1 outputs a turn-on signal to the first switching device, so that all of the switching devices are turned on by the turn-on signal, and thus a path between the test terminal 1 and the data lines Data is turned on; then the test terminal 1 inputs a panel lighting signal to perform the panel lighting test of the display panel.

However, based on the shape of the display panel, parts of the switching devices 2 need to be arranged along the arcs, which results in the distance between the test terminal 1 and the first switching device being farther, so that a relative longer line for connecting the test terminal 1 with the first switching device leads to a too large resistance. Since the plurality of switching devices 2 directly or indirectly acquires the turn-on signal from the first switching device, there is a certain degree of signal delay. The too large resistance of the line between the test terminal 1 and the first switching device will undoubtedly further aggravate the signal delay, which will result in the plurality of switches being turned on at different times. As for the switching device turned on later, the associated data line will fail to receive the panel lighting signal timely, thereby causing a problem in the display test and leading to a misjudgement.

SUMMARY

The embodiments of the present disclosure provide a display panel, a panel lighting test method thereof, and a display device, in order to solve the problem of insufficient test accuracy caused by signal delay in the related art.

In one aspect, an embodiment of the present disclosure provides a display panel, including a display area and a non-display area. The display area includes a plurality of data lines, and at least two of the data lines have different lengths. The non-display area includes a panel lighting test terminal and a switching circuit. The panel lighting test terminal is used for inputting a panel lighting signal to the display panel. The switching circuit includes a plurality of connected switching units, and each of the plurality of connected switching units is associated with at least two of the plurality of data lines. The panel lighting test terminal is connected to the plurality of connected switching units, and the panel lighting test terminal is also connected to an i-th switching unit through a first line, wherein the i-th switching unit is a switching unit in the plurality of switching units closest to said panel lighting test terminal.

In another aspect, an embodiment of the present disclosure provides a panel lighting test method of the display panel, the panel lighting test method of said display panel is applied to the display panel as described above, and the panel lighting test method of said display panel includes: in a first period of time, scanning signals are provided to gate lines in a time division manner; when each of the gate lines receives the scanning signal, the panel lighting test terminal provides the i-th switching unit with a turn-on signal to control all of the switching units to be turned on, and panel lighting signals are transmitted to the associated data lines through the switching units; and the i-th switching unit is a switching unit in the plurality of switching units closest to the panel lighting test terminal.

In another aspect, an embodiment of the present disclosure provides a display device, including the above-mentioned display panel.

BRIEF DESCRIPTION OF DRAWINGS

In order to more clearly illustrate technical solutions in embodiments of the present disclosure, the accompanying drawings used in the embodiments are briefly introduced as follows. Obviously, the drawings described as follows are merely part of the embodiments of the present disclosure, and other drawings can also be acquired according to the drawings by those skilled in the art without paying any creative efforts.

DESCRIPTION OF EMBODIMENTS

In order to better understand the technical solutions of the present disclosure, the embodiments of the present disclosure are described in detail below with reference to the accompanying drawings.

It should be clear that the embodiments described herein are only a part but not all of the embodiments of the present disclosure. All other embodiments obtained by those skilled in the art without any creative efforts based on the embodiments of the present disclosure shall fall within the protection scope of the present disclosure.

The terms used in the embodiments of the present disclosure are merely for the purpose of describing particular embodiments, but not intended to limit the present disclosure. Unless otherwise noted in the context, the singular form expressions "a", "an", "said" and "the" used in the embodiments and appended claims of the present disclosure are also intended to represent a plural form.

It should be understood that the term "and/or" is merely used herein to describe an relationship of associated objects, meaning that there may be three kinds of relationship, e.g., A and/or B may mean: A alone, A and B, and B alone. In addition, the character "/" generally means that the contextual objects have an "or" relationship.

Figure 2:
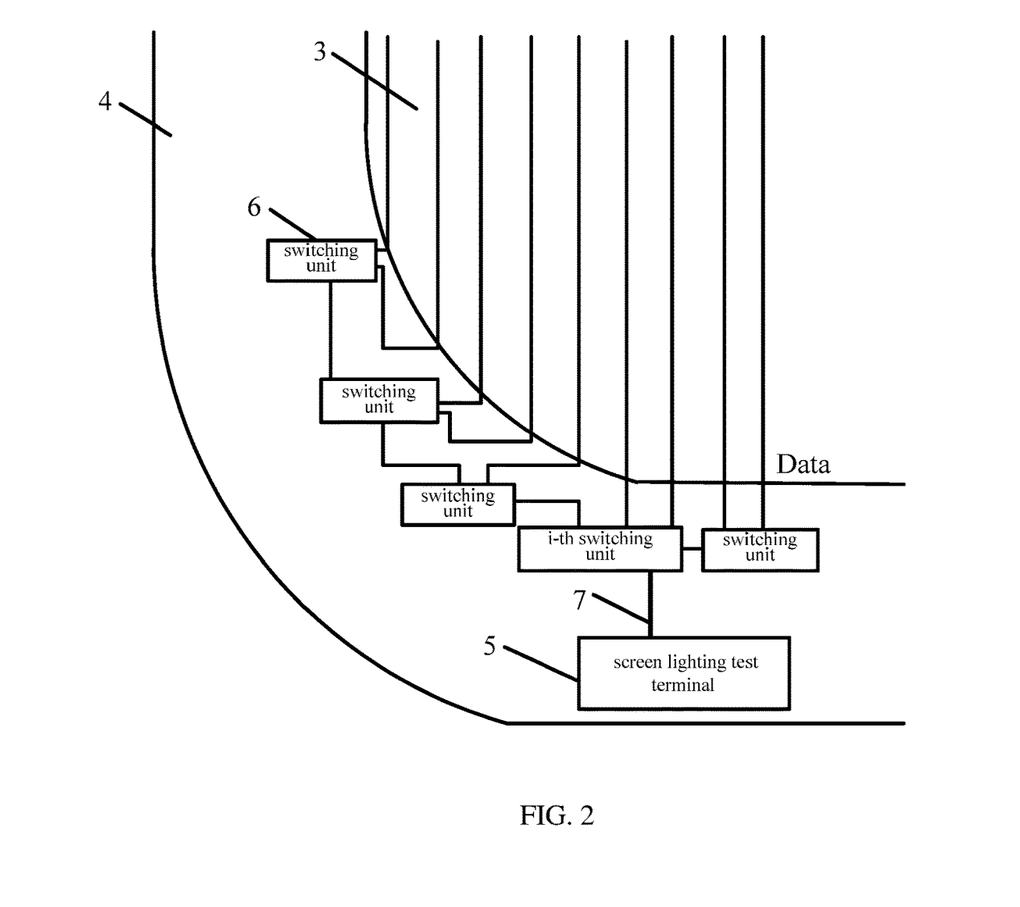
FIG. 2 is a schematic structural diagram I of a display panel provided by an embodiment of the present disclosure.
Figure 3:
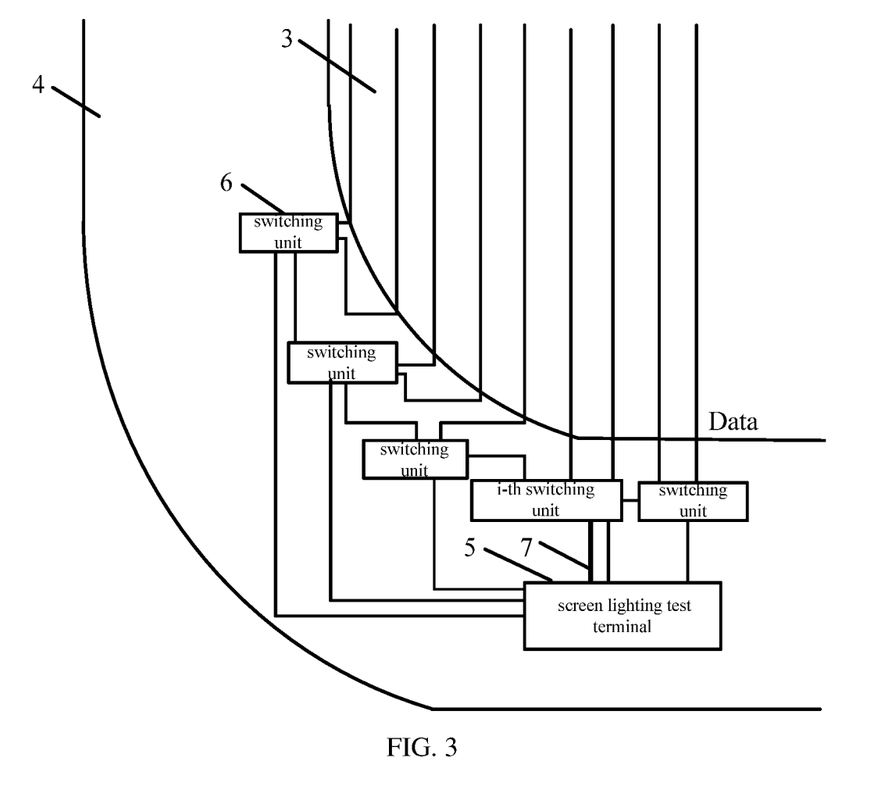
FIG. 3 is a schematic structural diagram II of a display panel provided by an embodiment of the present disclosure.

In the embodiment, a display panel is provided. As shown in FIG. 2 and FIG. 3, the display panel includes a display area 3 and a non-display area 4. The display area 3 is provided with a plurality of data lines Data, and at least two data lines Data are different in length in the display area. A panel lighting test terminal 5 and a switching circuit are disposed in the non-display area 4. The panel lighting test terminal 5 is used for inputting a panel lighting signal to the display panel. The switching circuit includes a plurality of connected switching units 6, and each switching unit 6 corresponds to at least two data lines Data.

The panel lighting test terminal 5 is respectively connected to the plurality of switching units 6, the panel lighting test terminal 5 is also connected to the i-th switching unit through a first line 7. The i-th switching unit is the switching unit in the plurality of switching units 6 closest to the panel lighting test terminal 5.

When a panel lighting test of the display panel is performed, the panel lighting test terminal 5 outputs a turn-on signal to the i-th switching unit in the switching circuit. Since the plurality of switching units 6 are connected to one another, all of the switching units 6 can be turned on by the turn-on signal. After the switching units 6 are turned on, the panel lighting test terminal 5 inputs panel lighting signals to the plurality of switching units 6, and the panel lighting signals are transmitted to pixels through the associated data lines Data so as to perform the panel lighting test of the display panel.

According to the display panel provided by the embodiment, when the panel lighting test terminal 5 provides the turn-on signal, the length of a first line 7 can be reduced by connecting the panel lighting test terminal 5 with the closest switching unit closest, and thus the resistance of the first line 7 can be reduced. Thus, when the panel lighting test terminal 5 transmits the turn-on signal through the first line 7, the signal delay problem can be effectively solved, so that the plurality of switching units 6 can be turned on by the turn-on signals in a relatively short period of time so as to overcome the defect that the panel lighting signals cannot be timely acquired by the data lines caused by part of switching units 6 being turned on later, thereby improving the accuracy of the test.

In addition, due to the relative short length of the first line 7, the first line 7 overlaps less or does not overlap with other lines, such as a line for connecting a gate line to a shift register, so that the interference of a scanning signal or other signals on the turn-on signal can be effectively reduced, thereby avoiding influence on the accuracy of the panel lighting test caused by the interference of the other signals.

Each of the switching units 6 includes N switches which are correspondingly connected to N data lines Data one to one, wherein N is a positive integer greater than 1. The j-th switch in one of the switching units is electrically connected to the j-th switch in any one of the other switching units, and 1≤j≤N. The panel lighting test terminal 5 is respectively connected to the N switches in the i-th switching unit.

Figure 4:
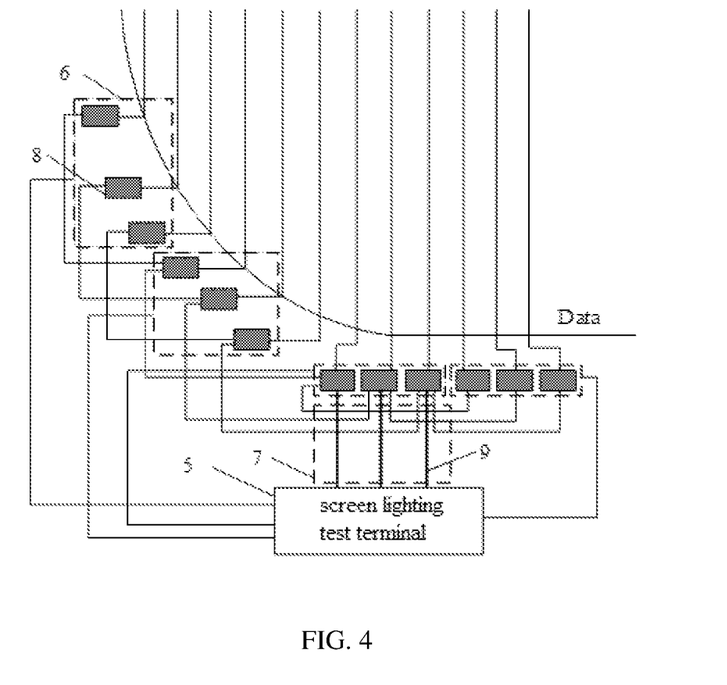
FIG. 4 is a schematic structural diagram III of a display panel provided by an embodiment of the present disclosure.

As shown in FIG. 4, by taking N=3 as an example, each of the switching units 6 includes three switches 8, each of the switches 8 is correspondingly connected to a data line Data, and the j-th switch in each switching unit 6 can be sequentially connected. By taking j=1 as an example, the sequential connection means that the first switch in the first switching unit is connected to the first switch in the second switching unit, the first switch in the second switching unit is connected to the first switch in the third switching unit, the first switch in the third switching unit is connected to the first switch in the fourth switching unit, and so on.

When the panel lighting test of the display panel is performed, in a first period of time, the panel lighting test terminal 5 outputs the turn-on signal to the first switch in the i-th switching unit, and the first switches in the plurality of switching units 6 are all turned on, that is, a path between the panel lighting test terminal 5 and the data line Data associated to the first switch in each of the switching units 6 is turned on, then the panel lighting test terminal 5 inputs the panel lighting signals, and the panel lighting signals are transmitted to the corresponding pixels through the data lines Data associated to all of the first switches; in a second period of time, the panel lighting test terminal 5 outputs the turn-on signal to the second switch in the i-th switching unit, and the second switches in the plurality of switching units 6 are all turned on, that is, a path between the panel lighting test terminal 5 and the data line Data associated to the second switch in each of the switching units 6 is turned on, then the panel lighting test terminal 5 inputs the panel lighting signals, and the panel lighting signals are transmitted to the corresponding pixels through the data lines Data associated to all of the second switches; in a third period of time, the panel lighting test terminal 5 outputs the turn-on signal to the third switch in the i-th switching unit, and the third switches in the plurality of switching units 6 are all turned on, that is, a path between the panel lighting test terminal 5 and the data line Data associated to the third switch in each of the switching units 6 is turned on, then the panel lighting test terminal 5 inputs the panel lighting signals, and the panel lighting signals are transmitted to the corresponding pixels through the data lines Data associated to all of the third switches.

Assuming that the display panel includes N*M data lines Data, if each switching unit 6 includes only one switch, that is, the display panel includes N*M connected switches 8. When the panel lighting test terminal 5 provides the single switch in the i-th switching unit with the turn-on signal, the other N*M−1 switches directly or indirectly acquire the turn-on signal through the switch in the i-th switching unit. In this way, a relatively long signal delay may appear, so that the switch in the switching unit farther away from the i-th switching unit may acquire the turn-on signal later. Then the data line associated to this switch cannot receive the panel lighting signal timely, thereby causing a problem in the display test and leading to a misjudgment.

However, by adopting the disposing mode provided by the embodiment, when the panel lighting test terminal 5 inputs the turn-on signal once, only M switches need to be controlled to be turned on. Compared with the case of simultaneously controlling the turn-on of N*M switches, the signal delay can be effectively reduced, ensuring that the switches required to be turned on simultaneously can receive the turn-on signal in a shorter time, and thus achieving that the associated data lines can timely receive the panel lighting signal and improving the accuracy of the panel lighting test.

Referring to FIG. 4 again, when each of the switching units 6 includes N switches 8, correspondingly, the first line 7 includes N switching control lines 9, and the N switching control lines 9 are correspondingly connected to the N switches 8 in the i-th switching unit one to one.

Figure 5:
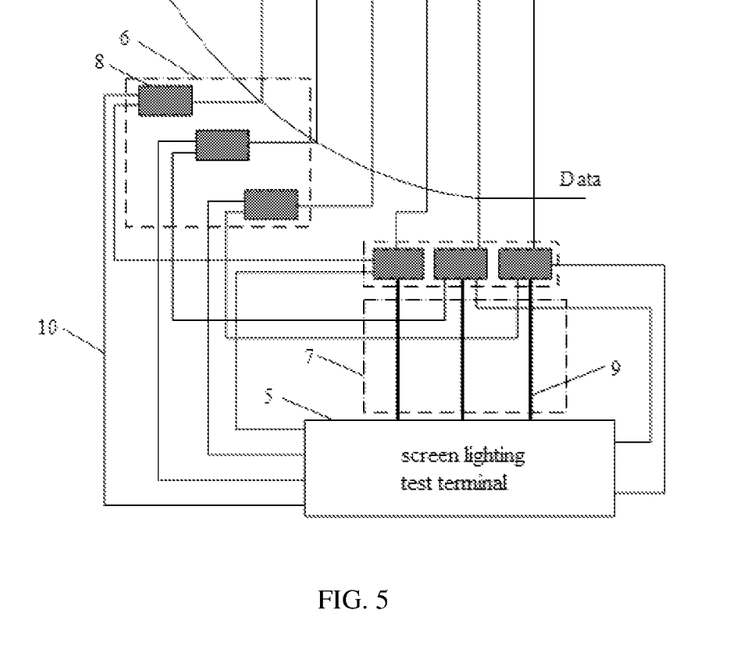
FIG. 5 is a schematic structural diagram IV of a display panel provided by an embodiment of the present disclosure.

It should be noted that the above-mentioned panel lighting signal refers to a data signal capable of driving the display panel to display. In order to realize the signal transmission between the panel lighting test terminal 5 and each data line Data, as shown in FIG. 5, a panel lighting signal line 10 is connected between the panel lighting test terminal 5 and each of the switches 8 in the plurality of switching units 6. After the panel lighting test terminal 5 controls the corresponding switch 8 to be turned on, the panel lighting test terminal 5 inputs the panel lighting signals, and then the panel lighting signals are transmitted to the corresponding switch 8 through the panel lighting signal lines 10 and then transmitted to the corresponding data lines Data through the switches 8.

Figure 6:
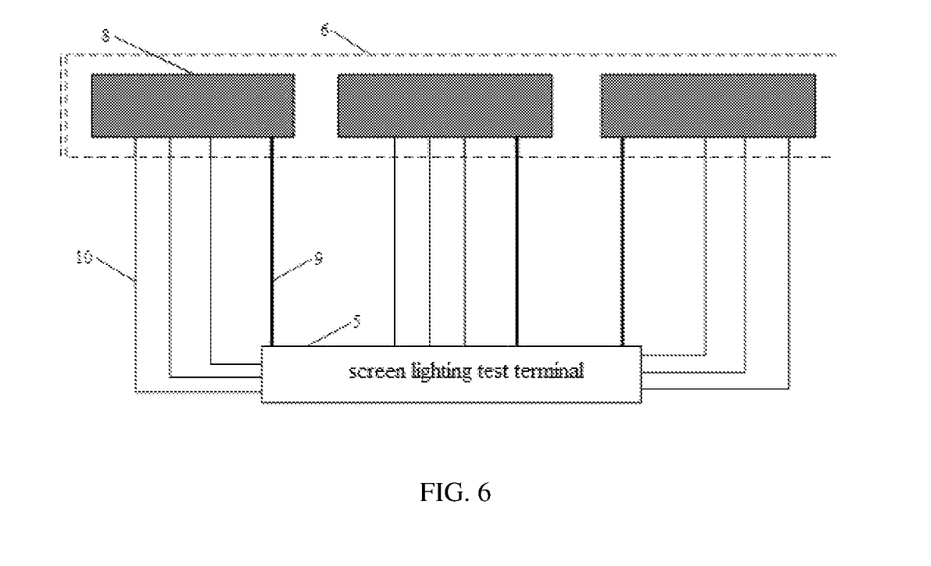
FIG. 6 is a partial schematic structural diagram of a display panel provided by an embodiment of the present disclosure.

According to the image colors required to be displayed on the display panel, the panel lighting signal line 10 connected between the panel lighting test terminal 5 and a switch 8 may include a red panel lighting signal line, a green panel lighting signal line and a blue panel lighting signal line. When the panel lighting signal line 10 includes the red panel lighting signal line, the green panel lighting signal line and the blue panel lighting signal line, the schematic diagram of the connection between the panel lighting test terminal 5 and each of the switches 8 in the i-th switching unit is shown in FIG. 6.

In an embodiment of each switching unit 6 including three switches 8, and the panel lighting signal line 10 including the red panel lighting signal line, the green panel lighting signal line and the blue panel lighting signal line, the panel lighting test method of the display panel performed through the panel lighting test terminal 5 is described in detail as follows:

In the first period of the panel lighting test, the panel lighting test terminal 5 inputs the turn-on signal to the first switch in the i-th switching unit, the first switches in the plurality of switching units 6 are all turned on, the panel lighting test terminal 5 inputs a red panel lighting signal to the red panel lighting signal lines associated to the first switches, and the red panel lighting signal is transmitted to the corresponding pixels via the data lines Data connected to the first switches; then the panel lighting test terminal 5 inputs the turn-on signal to the second switch in the i-th switching unit, the second switches in the plurality of switching units 6 are all turned on, the panel lighting test terminal 5 inputs a red panel lighting signal to the red panel lighting signal lines associated to the second switches, and the red panel lighting signal is transmitted to the corresponding pixels via the data lines Data connected to the second switches; and finally, the panel lighting test terminal 5 outputs the turn-on signal to the third switch in the i-th switching unit, the third switches in the plurality of switching units 6 are all turned on, the panel lighting test terminal 5 inputs a red panel lighting signal to the red panel lighting signal lines associated to the third switches, and the red panel lighting signal is transmitted to the corresponding pixels via the data lines Data connected to the third switches, thereby testing whether the pixels of the display panel are able to display red or not.

In the second period of the panel lighting test, the panel lighting test terminal 5 inputs the turn-on signal to the first switch in the i-th switching unit, the first switches in the plurality of switching units 6 are all turned on, the panel lighting test terminal 5 inputs a green panel lighting signal to the green panel lighting signal lines associated to the first switches, and the green panel lighting signal is transmitted to the associated pixels via the data lines Data connected to the first switches; then the panel lighting test terminal 5 inputs the turn-on signal to the second switch in the i-th switching unit, the second switches in the plurality of switching units 6 are all turned on, the panel lighting test terminal 5 inputs a green panel lighting signal to the green panel lighting signal lines associated to the second switches, and the green panel lighting signal is transmitted to the corresponding pixels via the data lines Data connected to the second switches; and finally, the panel lighting test terminal 5 outputs the turn-on signal to the third switch in the i-th switching unit, the third switches in the plurality of switching units 6 are all turned on, the panel lighting test terminal 5 inputs a green panel lighting signal to the green panel lighting signal lines associated to the third switches, and the green panel lighting signal is transmitted to the corresponding pixels via the data lines Data connected to the third switches, thereby testing whether the pixels of the display panel are able to display green or not.

In the third period of the panel lighting test, the panel lighting test terminal 5 inputs the turn-on signal to the first switch in the i-th switching unit, the first switches in the plurality of switching units 6 are all turned on, the panel lighting test terminal 5 inputs a blue panel lighting signal to the blue panel lighting signal lines associated to the first switches, and the blue panel lighting signal is transmitted to the corresponding pixels via the data lines Data connected to the first switches; then the panel lighting test terminal 5 inputs the turn-on signal to the second switch in the i-th switching unit, the second switches in the plurality of switching units 6 are all turned on, the panel lighting test terminal 5 inputs a blue panel lighting signal to the blue panel lighting signal lines associated to the second switches, and the blue panel lighting signal is transmitted to the corresponding pixels via the data lines Data connected to the second switches; and finally, the panel lighting test terminal 5 outputs the turn-on signal to the third switch in the i-th switching unit, the third switches in the plurality of switching units 6 are all turned on, the panel lighting test terminal 5 inputs a blue panel lighting signal to the blue panel lighting signal lines associated to the third switches, and the blue panel lighting signal is transmitted to the corresponding pixels via the data lines Data connected to the third switches, thereby testing whether the pixels of the display panel are able to display blue or not.

In an embodiment, the above-mentioned switches 8 can have a structure of a thin film transistor. When the switches 8 are thin film transistor, the gate of one thin film transistor is connected to the gate of the switching control line 9 or the gate of other thin film transistors, the first electrode of the thin film transistor is respectively connected to the red panel lighting signal line, the green panel lighting signal line and the blue panel lighting signal line, and the second electrode of the thin film transistor is connected to the data line Data. The first electrode of the thin film transistor is a source and the second electrode is a drain, or the first electrode of the thin film transistor is a drain and the second electrode is a source.

It can be understood that the above-mentioned panel lighting signal lines 10, connected between the panel lighting test terminal 5 and a switch 8, including the red panel lighting signal line, the green panel lighting signal line and the blue panel lighting signal line, is merely illustrative. In practical applications, the panel lighting signal lines 10 can be specifically disposed according to the test requirements. For example, when the panel lighting test is performed to test whether the display panel can display red or not, the panel lighting signal lines 10 may only include the red panel lighting signal line. When the panel lighting test is performed to test whether the display panel can display more colors or not, the panel lighting signal lines 10 may also include more lines for transmitting panel lighting signals in other colors, which is not specifically limited in the embodiment.

Figure 7:
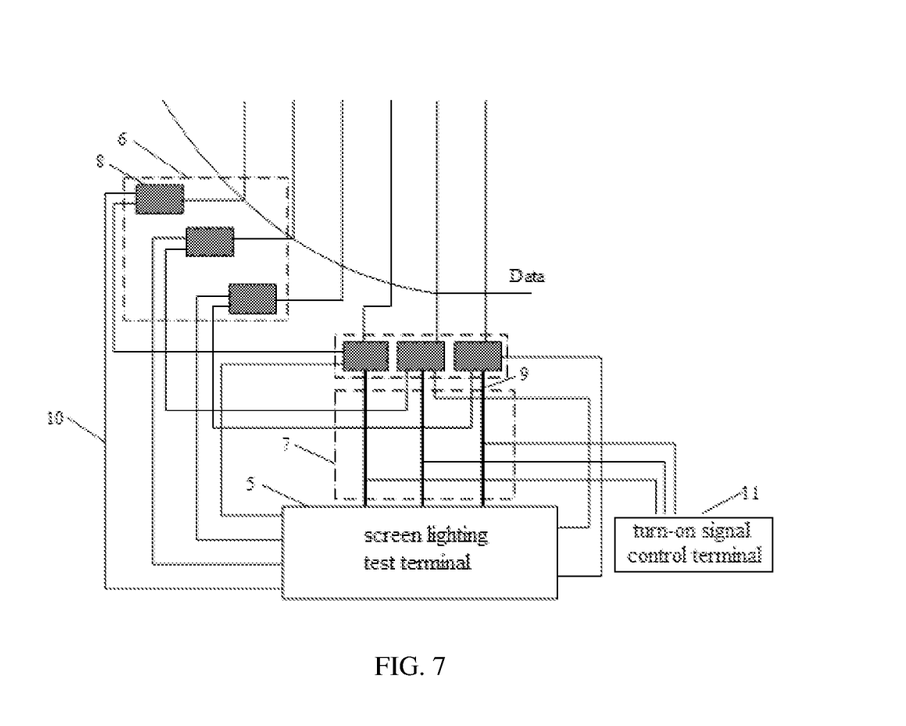
FIG. 7 is a schematic structural diagram V of a display panel provided by an embodiment of the present disclosure.

In addition, it should be noted that after the display panel is installed in a display device and put into use, it is no longer necessary to perform the panel lighting test of the display panel through the panel lighting test terminal 5. Therefore, in order to avoid affecting data signals transmitted on the data lines Data, the path between each of the switches 8 and the data line Data is necessary to be in a turn-on state after the panel lighting test of the display panel is finished. As shown in FIG. 7, the N switching control lines 9 of the first lines 7 may also be respectively connected to a turn-on signal control terminal 11, and the turn-on signal control terminal is used for providing the N switching control lines 9 with the turn-on signal after the panel lighting test of the display panel performed through the panel lighting test terminal 5 is finished, so that all of the switches 8 are turned on.

In an embodiment, when disposing the first lines 7, at least parts of the first lines 7 and the data lines Data may be disposed in the same layer. In addition, when the first lines 7 overlap with a portion of the data lines Data located in the non-display area 4, the first lines 7 are connected by a span bridge in the overlapping area. The first lines 7 being connected by the span bridge means that the first lines 7 are connected by a metal line made of a material different from the material of the first lines 7 in the area where the first lines 7 and the data lines Data overlap with one another. By means of span bridge connection, the signal crosstalk between the first lines 7 and the data lines Data can be avoided, thereby avoiding adverse influences the turn-on signal transmitted via the first lines 7 and the data signals transmitted via the data lines Data.

In addition, in order to verify that the delay problem with respect to the data lines receiving the panel lighting signals can be solved after the panel lighting test terminal 5 is connected to the switches 8 in the i-th switching unit, a simulation is performed in an embodiment.

Figure 8:
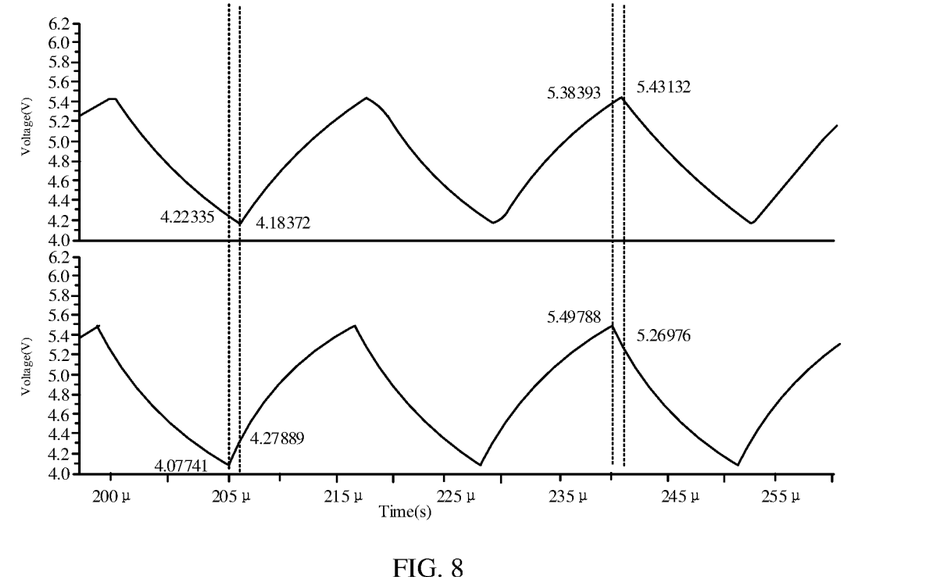
FIG. 8 is a simulation schematic diagram of a panel lighting test function corresponding to an embodiment of the present disclosure.

As shown in FIG. 8, a first curve is a curve corresponding to panel lighting signals acquired by the data lines in the existing display panel, and a second curve is a curve corresponding to panel lighting signals acquired by the data lines in the display panel provided by the present disclosure.

The simulation result shown in FIG. 8 reveals that, compared with the related art, in the display panel provided by the present disclosure, the data lines can earlier acquire the panel light signals provided by the panel lighting test terminal 5. Therefore, the display panel provided by the present disclosure can solve the problem that the data lines cannot acquire the panel lighting signals timely caused by part of the switching units 6 being turned on later.

For the panel lighting test of the display panel, in addition to performing the panel lighting test of the display panel through the panel lighting test terminal 5 before the display panel is put into use, the panel lighting test is also performed to test whether the display panel can display normally or not after the display panel is put into use.

Figure 9:
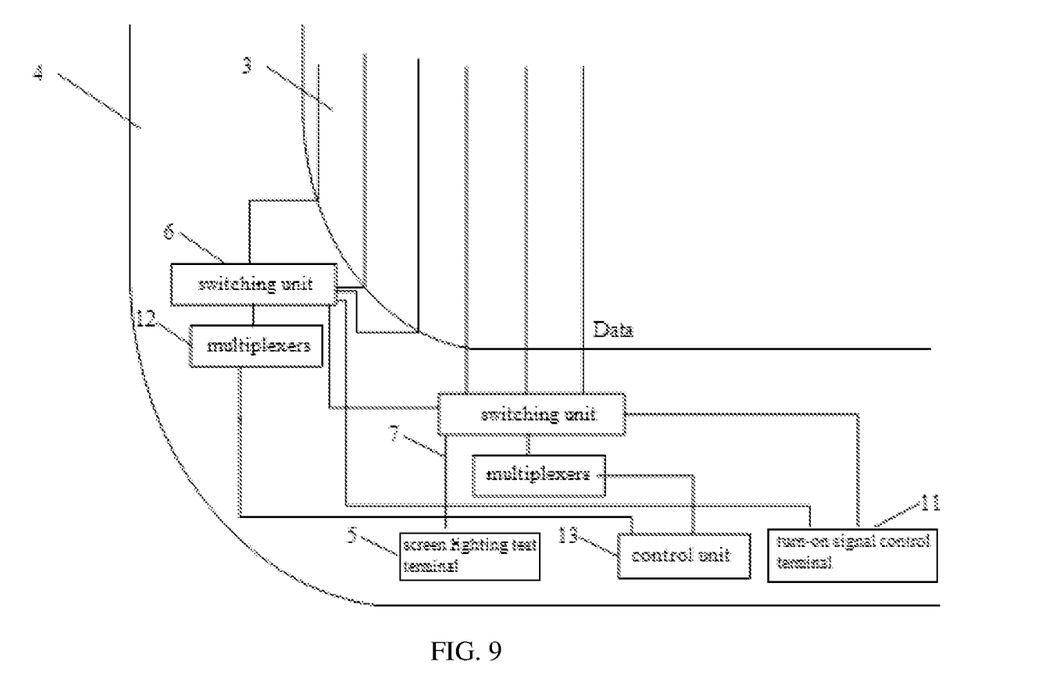
FIG. 9 is a schematic structural diagram VI of a display panel provided by an embodiment of the present disclosure.

As shown in FIG. 9, the display panel also includes a plurality of multiplexers 12 disposed in the non-display area 4, the plurality of multiplexers 12 associated to the plurality of switching units 6 in the switching circuit one to one, the multiplexers 12 being connected to the data lines Data through the associated switching units 6, and the plurality of multiplexers 12 being respectively connected to a control unit 13.

When the panel lighting test of the display panel is performed through the control unit 13, firstly, the turn-on signal control terminal provides the switching units 6 with a stable turn-on signal and controls the turn-on of the switching unit 6, so that paths between the data line Data and the multiplexer 12 are turned on; and then the control unit 13 controls the multiplexers 12, so that the data signals are provided to the associated data lines in a time division manner based on the working principle of the multiplexer 12.

Each of the multiplexers 12 includes a data signal input terminal, a plurality of clock signal terminals, and a plurality of data signal output terminals associated to the plurality of clock signal terminals one to one. The data signal input terminal and the plurality of clock signal terminals are respectively connected to the control unit 13. The plurality of data signal output terminals are correspondingly connected to the plurality of data lines one to one through the switching units 6 associated to the multiplexers 12. When the data signal output terminals provide the clock signal at the associated clock signal terminals, the data signals being input by the data signal input terminal are output to the associated data lines.

Figure 10:
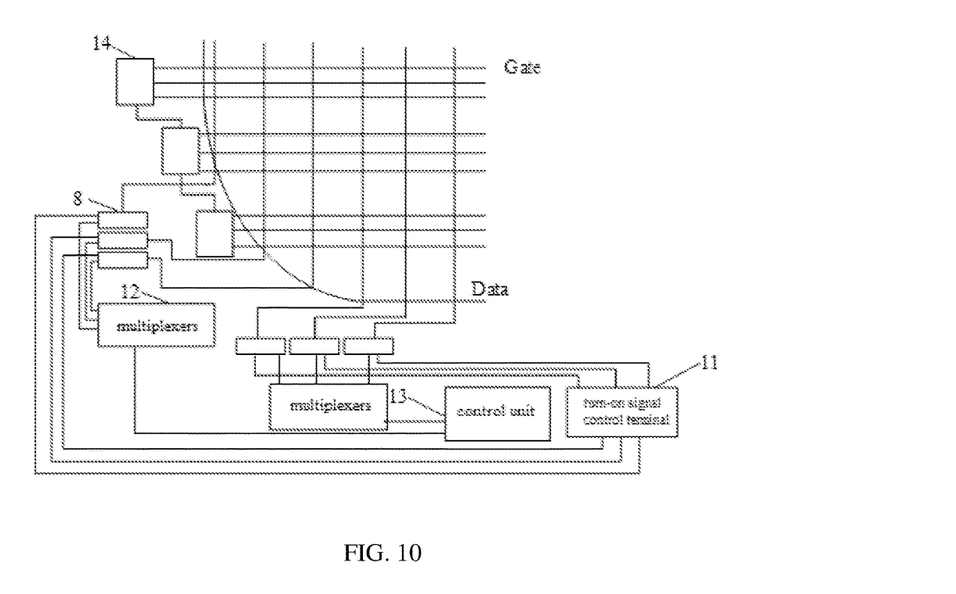
FIG. 10 is a schematic structural diagram VII of a display panel provided by an embodiment of the present disclosure.

In the embodiment in which each of the switching units 6 includes three switches 8, the process of performing the panel lighting test of the display panel through the control unit 13 is described in detail as follows:

As shown in FIG. 10, shift registers 14 are also disposed in the non-display area 4 of the display panel, and each of the shift registers 14 is respectively connected to a plurality of gate lines Gate. The structure and connection of the shift registers 14 are the same as the structure and connection of the shift registers 14 in the existing display panel, which will not be described herein again.

Each of the multiplexers 12 includes a data signal input terminal, three clock signal terminals (not shown), and three data signal output terminals. The data signal input terminal is connected to the control unit 13 for receiving the data signal provided by the control unit 13, the three clock signal terminals are respectively connected to the control unit 13, and the three data signal output terminals of each of the multiplexers 12 are respectively connected to the three switches 8 in the associated switching unit 6.

When the panel lighting test of the display panel is performed, firstly, the turn-on signal control terminal 11 provides a stable and continuous turn-on signal to the switches 8 in all of the switching units 6, and controls all of the switches 8 to be in a turn-on state. Then the shift register 14 provides the associated gate line Gate with scanning signals in a time-division manner. When each of the gate lines Gate receives the scanning signal, the plurality of multiplexers 12 begin to work simultaneously under the control of the control unit 13: paths between the three output terminals of each multipexer 12 and the associated data lines Data are sequentially turned on, and the control unit 13 provides the corresponding data signals to the corresponding pixels through the data lines Data in the period of a path between one data line Data and the data signal input terminal being turned on, in order to control the light-emitting of the pixels and thus to accomplish the panel light test of the display panel.

It should be noted that, with reference to FIG. 7 and FIG. 10, when the panel lighting test of the display panel is performed through the control unit 13, the panel lighting signal lines 10 connected to each of the switching units 6 are in a vacant state, that is, the panel lighting test terminal 5 does not provide the panel lighting signals to the panel lighting signal lines 10.

In addition, in order to make full use of the space when disposing the lines in the non-display area 4, the lines for connecting the control unit 13 to the multiplexers 12 and the panel lighting signal lines 10 for connecting the panel lighting test terminal 5 to the plurality of switching units 6 may overlap with one another. However, this overlap does not adversely affect the test of the display panel.

With reference to FIG. 7 and FIG. 10, before the display panel is put into use, when the panel lighting test of the display panel is performed through the panel lighting test terminal 5, the panel lighting test terminal 5 provides the corresponding switches 8 with the panel lighting signals through the panel lighting signal lines 10. As the control unit 13 does not provide the data signal at this time, no signal transmission takes place on the lines for connecting the control unit 13 to the multiplexers 12, and those line does not interfere with the panel lighting signals transmitted on the panel lighting signal lines 10, and thus the panel lighting test of the display panel performed by using the panel lighting test terminal 5 cannot be adversely affected.

After the display panel is put into use, when the panel lighting test of the display panel is performed through the control unit 13, and the control unit 13 provides the multiplexer 12 with data signals through the lines for connecting the control unit 13 to the multiplexers 12. As the panel lighting test terminal 5 does not provide the panel lighting signal, no signal transmitted takes place on the panel lighting signal lines 10, and the data signals transmitted on the lines for connecting the control unit 13 with the multiplexers 12 cannot be interfered, and thus the panel lighting test of the display panel performed by using the control unit 13 cannot be adversely affected.

In an embodiment, the above-mentioned control unit 13 may be integrated in a driving chip. When the control unit 13 is integrated in the driving chip, it is unnecessary to reserve an additional disposing position for the control unit 13 on the non-display area 4, so that the corresponding border width of the non-display area 4 can be further reduced.

It should be understood that a circuit board binding area and a chip binding area are disposed in the non-display area 4 of the display panel. When the driving chip is fixed on a flexible circuit board, the control unit 13 and the multiplexers 12 are respectively connected to corresponding pins in the circuit board binding area. When the driving chip is not fixed on the flexible circuit board, the control unit 13 and the plurality of multiplexers 12 are respectively connected to corresponding pins in the chip binding area.

Figure 11:
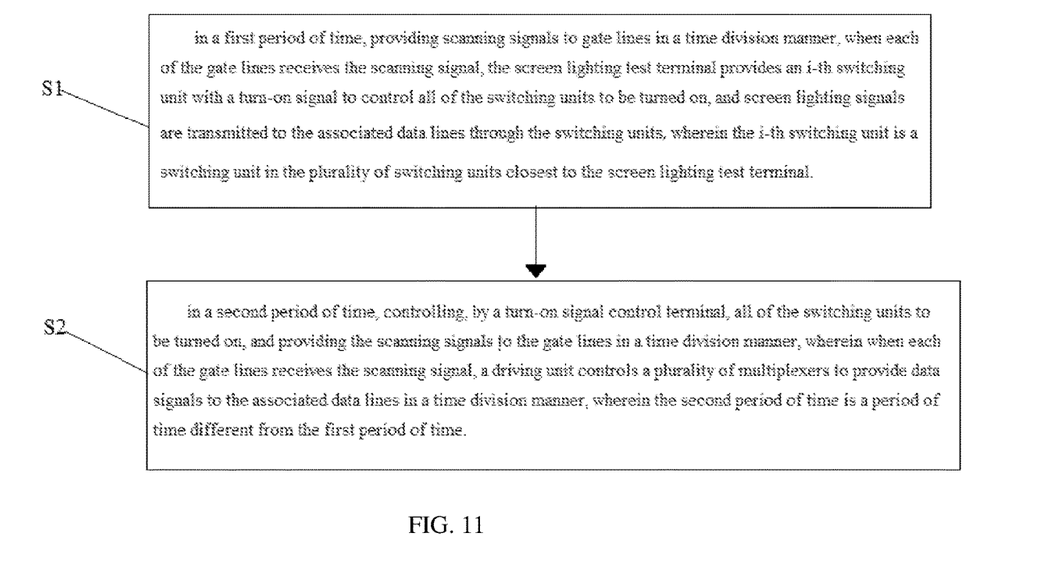
FIG. 11 is a flowchart of a panel lighting test method of a display panel provided by an embodiment of the present disclosure.

An embodiment also provides a panel lighting test method of the display panel, the panel lighting test method of the display panel being applied to the above-mentioned display panel. As shown in FIG. 11, the panel lighting test method of the display panel includes the following step:

Step S1: in a first period of time, the scanning signals are provided to gate lines in a time division manner; when each of the gate lines receives the scanning signal, the panel lighting test terminal provides the i-th switching unit with turn-on signal to control all of the switching units to be turned on, and the panel lighting signals are transmitted to the associated data lines via the switching units, wherein the i-th switching unit is the switching unit in the plurality of switching units closest to the panel lighting test terminal.

Based on the structure of the display panel, by connecting the panel lighting test terminal to the i-th switching unit, the length of the first line for connecting the panel lighting test terminal to the i-th switching unit can be reduced, and thus the resistance of the first line can be reduced. Therefore, in the panel lighting test of the display panel performed by means of the panel lighting test method of the display panel provided by the present disclosure, when the panel lighting test terminal provides the i-th switching unit with the turn-on signal through the first line, the signal delay problem can be effectively solved, so that the plurality of switching units can be turned on by the turn-on signal in a relatively short period of time, thereby overcoming the defect that the panel lighting signals cannot be timely acquired caused by parts of the switching units being turned on later, thus improving the accuracy of the panel lighting test.

Exemplarily, when each of the switching units includes three switches, the step S1, in which panel lighting test terminal provides the i-th switching unit with the turn-on signal to control all of the switching units to be turned on, and the panel lighting signals are transmitted to the associated data lines through the switching units, includes:

The panel lighting test terminal provides the first switch in the i-th switching unit with the turn-on signal to control the first switches in all of the switching units to be turned on, and the panel lighting signals are transmitted to the associated data lines through the first switches that have been turned on; the panel lighting test terminal provides the second switch in the i-th switching unit with the turn-on signal to control the second switches in all of the switching units to be turned on, and the panel lighting signals are transmitted to the associated data lines through the second switches that have been turned on; the panel lighting test terminal provides t the third switch in the i-th switching unit with the turn-on signal to control the third switches in all of the switching units to be turned on, and the panel lighting signals are transmitted to the associated data lines through the third switches that have been turned on.

In addition, referring to FIG. 11 again, the panel lighting test method of the display panel also includes the following step:

Step S2: in a second period of time, all of the switching units are turned on by the turn-on signal control terminal, and the scanning signals are provided to the gate lines in a time division manner; when each of the gate lines receives the scanning signal, a driving unit controls the plurality of multiplexers to work so as to provide the data signals to the associated data lines in a time division manner; wherein the second period of time is a period of time different from the first period of time.

Based on the structure of the multiplexer, the driving unit controls the plurality of multiplexers to work so as to provide the data signals to the corresponding data lines in a time division manner, including: the plurality of clock signal terminals in each of the plurality of multiplexers input the clock signals in a time division manner to control paths between the plurality of data lines connected to the plurality of multiplexers and the data signal input terminal to be sequentially turned on, and the corresponding data signal output terminal transmits the data signal to a data line, the data signal being input by the data signal input terminal to a data line, when the path between the data signal input terminal and one data line is turned on.

It should be noted that the panel lighting test performed through the panel lighting test terminal and the panel lighting test performed through the driving unit are at different periods of time respectively. In the first period of time, when the panel lighting test of the display panel is performed through the panel lighting test terminal, the control unit does not provide data signals; in the second period of time, when the panel lighting test of the display panel is performed through the control unit, the panel lighting test terminal does not provide panel lighting signals. Therefore, these two panel lighting test methods do not interfere with each other.

Figure 12:
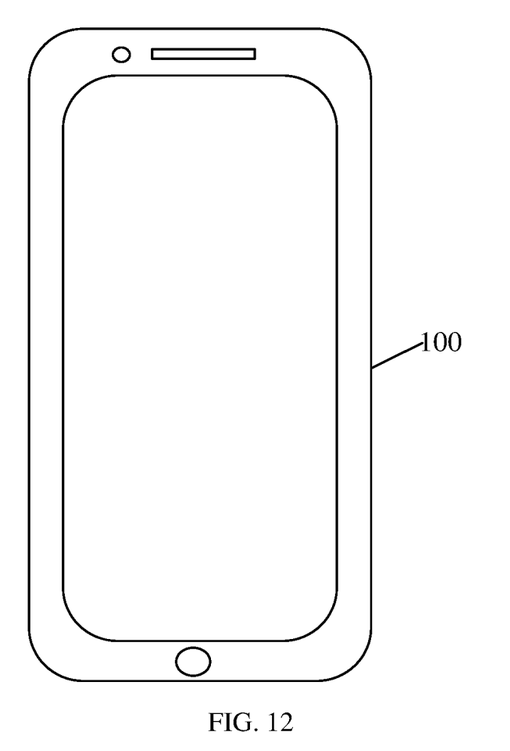
FIG. 12 is a schematic structural diagram of a display device provided by an embodiment of the present disclosure.

The present disclosure also provides a display device. As shown in FIG. 12, the display device 100 includes the above-mentioned display panel, wherein the exact structure and the panel lighting test method of the display panel have been described in details in the above embodiments, which will not be described herein again. The display device 100 shown in FIG. 12 is merely illustrative. The display device 100 may be any electronic device with a display function, such as cell phone, tablet computer, notebook computer, an electronic book, television set and the like.

Since the display device includes the above-mentioned display panel, the display device provided by the embodiment can effectively solve the signal delay problem, and the misjudgment is avoided during performing the panel lighting test, thereby improving the accuracy of the panel lighting test.

The foregoing descriptions are merely preferred embodiments of the present disclosure, and are not used to limit the present disclosure. Any modifications, equivalent substitutions, improvements, and the like made based on the spirit and principle of the present disclosure should be included in the protection scope of the present disclosure.

What is claimed is:

1. A display panel comprising:
   a display area comprising a plurality of data lines, wherein at least two of the plurality of data lines have different lengths; and
   a non-display area comprising a panel lighting test terminal and a switching circuit, wherein the switching circuit comprises a plurality of switching units sequentially electrically connected to one another and connected to the panel lighting test terminal,
   wherein each of the plurality of switching units is associated with at least two of the plurality of data lines and connected to the panel lighting test terminal,
   wherein the plurality of switching units comprises an i-th switching unit that is closest to the panel lighting test terminal, and
   wherein, during a panel lighting test, the panel lighting test terminal inputs a turn-on signal to the i-th switching unit, and the turn-on signal is sequentially transmitted from the i-th switching unit to every other switching unit of the plurality of switching units.

2. The display panel according to claim 1, wherein each of the plurality of switching units comprises N switches correspondingly connected to N data lines one to one, and N is a positive integer greater than 1;
   wherein a j-th switch in one of the plurality of switching units is electrically connected to a j-th switch in any other switching unit, and $1 \leq j \leq N$; and
   wherein the panel lighting test terminal is connected to the N switches in the i-th switching unit through first lines respectively.

3. The display panel according to claim 2, wherein N is equal to 3.

4. The display panel according to claim 2, wherein the first lines comprise N switching control lines, the N switching control lines being correspondingly connected to the N switches in the i-th switching unit one to one.

5. The display panel according to claim 4, wherein the N switching control lines in the first lines are also respectively connected to a turn-on signal control terminal, the turn-on signal control terminal being used for providing the N switching control lines with the turn-on signal so as to turn on the associated switches after performing a panel lighting operation for the display panel by using the panel lighting test terminal.

6. The display panel according to claim 2, wherein the panel lighting test terminal is connected respectively to each of the switches in each of the plurality of switching units through a panel lighting signal line, for inputting a panel lighting signal to each of the switches in each of the plurality of switching units during the panel lighting test.

7. The display panel according to claim 6, wherein the panel lighting signal line connected between the panel lighting test terminal and one of the switches comprises a red panel lighting signal line, a green panel lighting signal line and a blue panel lighting signal line.

8. The display panel according to claim 2, wherein at least part of the first lines is disposed in a same layer as the data lines.

9. The display panel according to claim 8, wherein the first lines overlap with a portion of the data lines extending to the non-display area to form an overlapping area, and each of the first lines is connected by a span bridge in the overlapping area.

10. The display panel according to claim 1, wherein the display panel further comprises:
    a plurality of multiplexers disposed in the non-display area, wherein the plurality of multiplexers are associated with the plurality of switching units in the switching circuit one to one, each of the plurality of multiplexers being connected to each of the plurality of data lines through one associated switching unit, and each of the plurality of multiplexers being also connected to a respective control unit.

11. The display panel according to claim 10, wherein each of the plurality of multiplexers includes a data signal input terminal, a plurality of clock signal terminals, and a plurality of data signal output terminals associated with the plurality of clock signal terminals one to one,
    wherein the data signal input terminal and the plurality of clock signal terminals are respectively connected to the control unit, the plurality of data signal output terminals are respectively connected to the plurality of data lines one to one through the switching units associated to the plurality of multiplexers, when each of the plurality of data signal output terminals provides clock signals at one associated clock signal terminal, the data signal output terminal outputs data signals to one associated data line, wherein the data signals being input by the data signal input terminal.

12. The display panel according to claim 10, wherein lines for connecting the control unit to the multiplexers overlap with lines for connecting the panel lighting test terminal to the plurality of switching units.

13. The display panel according to claim 10, wherein the control unit is integrated in a driving chip.

14. The display panel according to claim 13, wherein the non-display area comprises a chip binding area, and the control unit and the plurality of multiplexers are respectively connected to pins in the chip binding area.

15. The display panel according to claim 13, wherein the driving chip is fixed on a flexible circuit board, the non-display area comprises a circuit board binding area, and the control unit and the plurality of multiplexers are respectively connected to pins in the circuit board binding area.

16. A panel lighting test method of the display panel, wherein the panel lighting test method of the display panel is applied to the display panel according to claim 1, and the panel lighting test method of the display panel comprises:
   in a first period of time, providing scanning signals to gate lines in a time division manner, wherein, when each of the gate lines receives the scanning signal, the panel lighting test terminal provides the i-th switching unit with the turn-on signal to control all of the switching units to be turned on, and panel lighting signals are transmitted to the associated data lines through the switching units.

17. The panel lighting test method of the display panel according to claim 16, wherein each switching unit of the plurality of switching units comprises three switches, the panel lighting test terminal provides the i-th switching unit with the turn-on signal to control all of the switching units to be turned on, and the panel lighting signals are transmitted to the associated data lines through the switching units, in such a manner that:
   the panel lighting test terminal provides the first switch in the i-th switching unit with the turn-on signal to control the first switches in all of the switching units to be turned on, and the panel lighting signals are transmitted to the associated data lines through the first switches that have been turned on;
   the panel lighting test terminal provides the second switch in the i-th switching unit with the turn-on signal to control the second switches in all of the switching units to be turned on, and the panel lighting signals are transmitted to the associated data lines through the second switches that have been turned on; and
   the panel lighting test terminal provides the third switch in the i-th switching unit with the turn-on signal to control the third switches in all of the switching units to be turned on, and the panel lighting signals are transmitted to the associated data lines through the third switches that have been turned on.

18. The panel lighting test method of the display panel according to claim 16, wherein the panel lighting test method of the display panel further comprises:
   in a second period of time, controlling, by a turn-on signal control terminal, all of the switching units to be turned on, and providing the scanning signals to the gate lines in a time division manner, wherein when each of the gate lines receives the scanning signal, a driving unit controls a plurality of multiplexers to provide data signals to the associated data lines in a time division manner;
   wherein the second period of time is a period of time different from the first period of time.

19. The panel lighting test method of the display panel according to claim 18, wherein the driving unit controlling the plurality of multiplexers to provide the data signals to the associated data lines in a time division manner comprises:
   a plurality of clock signal terminals in each of the plurality of multiplexers input clock signals in the time division manner to control paths between the plurality of data lines connected to the plurality of multiplexers and the data signal input terminal to be sequentially turned on, and when the path between the data signal input terminal and one of the data lines is turned on, the associated data signal output terminal transmits the data signals to this data line, the data signal being input by the data signal input terminal.

20. A display device, wherein the display device includes the display panel as set forth in claim 1.

* * * * *